June 30, 1936. G. E. FREDERICKS 2,045,640
THERMAL CONDUCTIVITY CELL
Filed Oct. 29, 1934
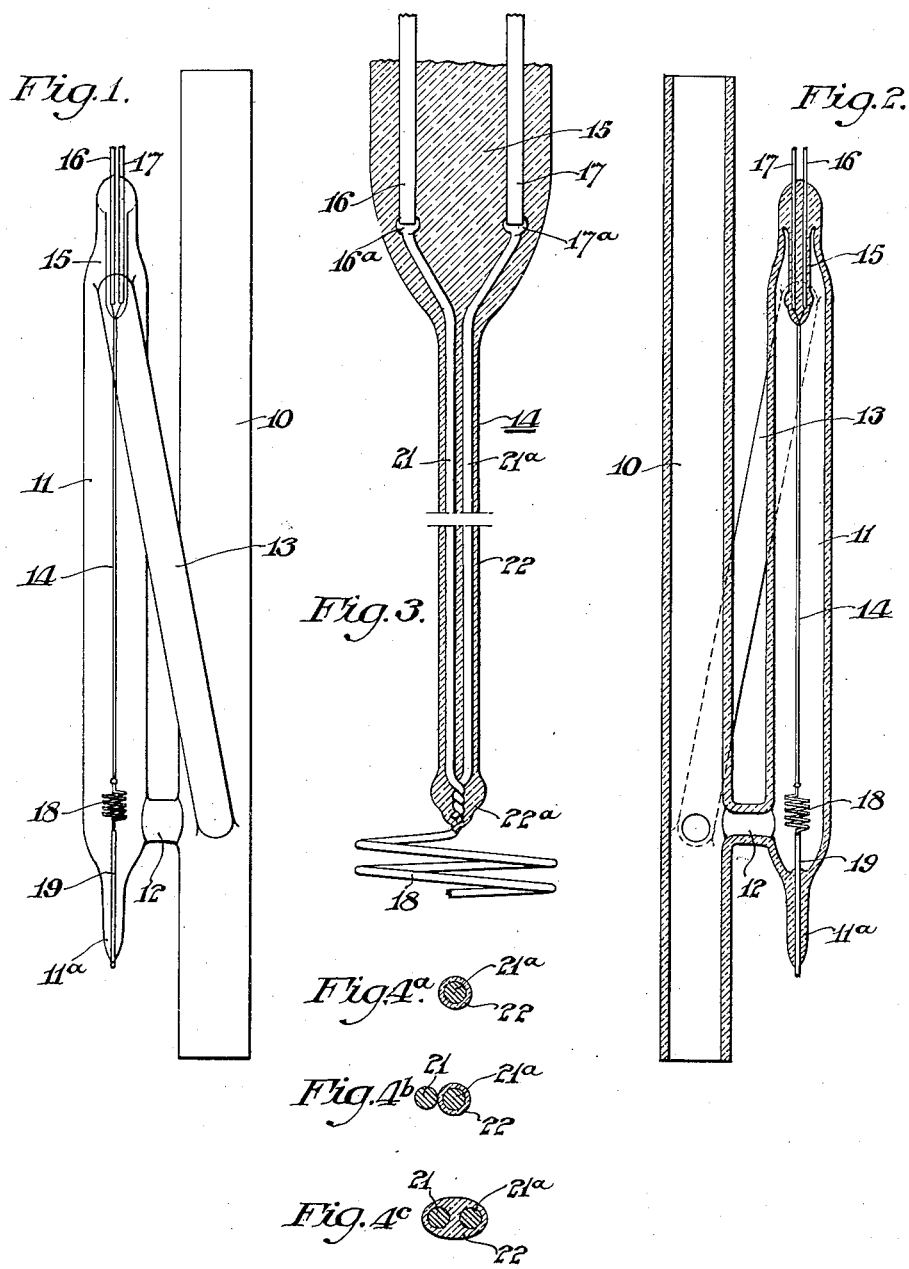
INVENTOR:
George E. Fredericks,
BY
Cornelius L. Ehret
ATTORNEY.

Patented June 30, 1936

2,045,640

UNITED STATES PATENT OFFICE 2,045,640

THERMAL CONDUCTIVITY CELL

George E. Fredericks, Somerton, Philadelphia, Pa., assignor to Leeds & Northrup Company, Philadelphia, Pa., a corporation of Pennsylvania Application October 29, 1934, Serial No. 750,522

9 Claims. (Cl. 73—51)

My invention relates to thermal conductivity cells, that is, cells in which a physical or chemical condition of a fluid is determined by its thermal conductivity which, in turn, may be measured by measuring the temperature of an element continuously transmitting heat to the fluid under substantially fixed conditions.

In accordance with my invention, a thermal conductivity cell comprising an elongated envelope, preferably of glass or other non-corrodible material, has as its active element an electrical resistance element, preferably non-inductive as by forming it into a single bifilar loop, coated with an intimate non-corrodible coating, such as glass, and the electrical terminals of the resistance element project from and are sealed in the same end of the envelope. There is also provided non-corrodible means for tensioning the resistance element within the envelope, which may comprise a glass spring, together with means for adjusting the tension of the spring sealed in the end of the envelope.

For a better understanding of my invention, together with other and further features thereof, reference is had to the following description, taken in connection with the accompanying drawing, and its scope will be pointed out in the appended claims.

In the drawing, Fig. 1 is a side elevation of a thermal conductivity cell embodying my invention;

Fig. 2 is a longitudinal section of the cell of Fig. 1;

Fig. 3 is a longitudinal section, enlarged, of the active element of the cell of Fig. 1 and its mounting;

Figs. 4a, 4b and 4c are enlarged cross-sectional views of the active element of Fig. 1 illustrating several stages in the construction of the element.

The use of thermal conductivity cells for determining physical or chemical characteristics of liquid and gaseous fluids has become well-established in the art. It is known that many of the fluids adaptable to measurements by such a cell are decidedly corrosive in their action so that it is highly desirable that all parts of the cell exposed to the fluid shall be substantially non-corrodible.

In accordance with my invention, this characteristic is secured by constructing or coating all of the elements of the cell with a non-corrodible substance such as glass. It is also desirable, obviously, that the cell should have the maximum sensitivity; that is, afford a maximum change in derived condition, for example, electrical resistance of a resistance element, in response to a given change in the primary condition, for example, the thermal conductivity of a gas, without, at the same time, increasing the time lag of the cell, which is dependent largely upon the mass of the active element of the cell and its thermal relation to the fluid being tested.

More particularly, in accordance with my invention, a high degree of sensitivity is obtained without, at the same time, sacrificing the time constant or speed of response of the device by constructing the active element in the form of a loop of extremely fine resistance wire, such as a platinum filament, intimately coated with glass, the coating serving not only to insulate the two strands of the loop, but to protect the strands from the corrosive action of the fluid being tested. The maximum cross-sectional dimension of the complete active element preferably does not exceed 0.5 millimeter, with the result that the platinum resistance element is in superior thermal contact with the fluid being tested, while the mass of the active element is reduced to a minimum.

Referring now more particularly to Figs. 1 and 2 of the drawing, there is shown a thermal conductivity cell comprising a conduit 10 through which is passed the fluid to be measured, and an envelope 11 in communication therewith by means of a tubular passage 12 interconnecting the lower end of the envelope 11 with the conduit, and a tubular passage 13 interconnecting the upper end of the envelope 11 with the conduit 10, preferably at the same level as the passage 12, in order that the circulation of fluid through the envelope 11 shall be only that produced by the thermosiphon action of the heater presently to be described. However, this latter feature comprises no part of my present invention, but it is disclosed and claimed in United States Letters Patent No. 1,504,707, granted August 12, 1924, upon the application of J. C. Peters, Jr.

The entire unit, comprising the conduit 10, envelope 11 and tubular passages 12 and 13, is preferably fabricated of glass and is thus substantially non-corrodible by any of the fluids usually measured by such a device. Mounted within the envelope 11 is an active element 14 comprising a single loop of resistance wire, preferably a platinum filament intimately coated with glass, as described in more detail hereinafter.

The element 14 is supported at its upper end from a reentrant portion 15 of the envelope 11, and the terminals of the loop are connected to lead-in wires 16, 17, as by welding, the wires 16 and 17 being sealed in the reentrant portion 15 in a manner well understood by those skilled in the art. To the lower end of the element 14 is attached a helical spring, preferably made of glass, so as to be substantially non-corrodible, and the spring 18, in turn, connects with a glass-coated lead-in rod or wire 19 which extends through the lower tip 11a of the envelope 11. The tension on the thermal element 14 is adjusted by means of the rod 19 which is thereafter sealed to fix the tension on the thermal element 14.

The details of the structure and mounting of the thermal element 14 will be more clearly understood by reference to Figs. 3 and 4a, 4b and 4c of the drawing, which illustrate these features on a very much enlarged scale. As shown, the element 14 comprises a single bifilar non-inductive loop of fine resistance wire, such as a platinum filament, the strands 21 and 21a of which are connected, as by welding, at 16a and 17a to the lead-in wires 16 and 17, respectively, which are sealed in the reentrant portion 15 of the envelope 11. The lower tip of the thermal element 14 is secured to the glass spring 18 as by fusing a small globule of glass thereto. The maximum cross-sectional dimension of the element 14 may be of the order of from 0.1 to 1.0 millimeter and preferably should not exceed 0.5 millimeter. These dimensions are determined not only by the fact that the total mass of the element 14 should be a minimum and the loop 21, 21a should be separated from the fluid being tested by a minimum of corrosion-preventing material in order to secure a high thermal conductivity, but also by the fact that the diameter of the envelope 11 preferably should not exceed ⅜ inches. Therefore, in order to secure as uniform distribution of the fluid in the envelope 11 as possible, the thermal element 14 must be of very small diameter. It has also been found experimentally that a fluid film surrounding a wire of small diameter is more stable than in the case of a larger thermal element.

The element 14 may be fabricated in any of several manners. By way of example, one of the strands, for example, the strand 21a, may be initially coated with glass, as indicated in Fig. 4a. An uncoated separate strand 21 is laid against the coated strand, as indicated in Fig. 4b, and an additional coating of glass is then applied, resulting in the element, as indicated in Fig. 4c. The element is then cut to the desired length, as by a pair of scissors, and the cut end is heated in a flame to expose the separate strands. The exposed wires or strands are then twisted and welded and the welded end attached to the glass spring 18 by a bead of glass which also covers the exposed wires, as indicated in Fig. 3. As an alternative, a strand of resistance element may be passed through a capillary glass tubing and doubled back on the outside of the tubing, or an additional strand welded thereto at one end and the whole inserted in a larger glass tubing which is then heated and drawn down to the desired dimensions.

Thus, by employing my invention as described above, maximum sensitivitiy is obtained because of the double length of the non-inductive resistance element 21, 21a with no sacrifice in the time constant of the device and, at the same time, all elements of the device are positively protected from the corrosive effect of the fluids being tested.

It will be understood that the above-described thermal conductivity cell may be used in any suitable measuring system such, for example, as that disclosed in the above-mentioned Peters patent, and that it may be used in connection with any suitable standard cell which preferably is identical, in all respects, to the envelope 11, but with the fluid inlet 12 and outlet 13 omitted, and a suitable quantity of standard gas sealed within the envelope.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim is:

1. A thermal conductivity cell comprising an elongated envelope including a fluid inlet and a fluid outlet, a bifilar electrical resistance element having an intimate non-corrodible coating serving to retain the strands of said element in fixed relationship and to insulate the strands of the element from each other, electrical terminals for said resistance element projecting from and sealed in the same end of said envelope, and means for tensioning said resistance element within said envelope.

2. A thermal conductivity cell comprising an elongated envelope including a fluid inlet and a fluid outlet, an electrical resistance element comprising a single loop, the strands of said loop being intimately coated with glass to insulate them from each other and protect them from corrosion, electrical terminals for said resistance element projecting from and sealed in the same end of said envelope, and means for tensioning said resistance element within said envelope.

3. A thermal conductivity cell comprising an elongated envelope including a fluid inlet and a fluid outlet, an electrical resistance unit consisting of a single loop of resistance wire, the strands of said loop being intimately coated with glass to insulate them from each other and protect them from corrosion, the largest cross-sectional dimension of said unit being less than one millimeter to stabilize the fluid film surrounding said unit, electrical terminals for said resistance element projecting from and sealed in the same end of said envelope, and means for tensioning said resistance element within said envelope.

4. A thermal conductivity cell comprising an elongated envelope including a fluid inlet and a fluid outlet, an electrical resistance element having an intimate non-corrodible coating, electrical terminals for said resistance element projecting from and sealed in the same end of said envelope and supporting one end of said element therefrom, and a spring of vitreous material interconnecting the other end of said element and the other end of said envelope for maintaining said coated element under tension.

5. A thermal conductivity cell comprising an elongated envelope including a fluid inlet and a fluid outlet, an electrical resistance element having an intimate non-corrodible coating, electrical terminals for said resistance element projecting from and sealed in the same end of said envelope and supporting one end of said element therefrom, and a filamentary glass spring interconnecting the other end of said element and envelope.

6. A thermal coductivity cell comprising an elongated envelope including a fluid inlet and a fluid outlet, an electrical resistance element having an intimate non-corrodible coating, electrical terminals for said resistance element projecting from and sealed in the same end of said envelope and supporting one end of said element therefrom, a filamentary glass spring for tensioning said resistance element, and a lead-in member secured to said spring and sealed in the other end of said envelope, said lead-in member being effective to adjust the tension of said resistance element before being sealed in.

7. A thermal conductivity cell comprising an elongated glass envelope including a fluid inlet and a fluid outlet, an electrical resistance element comprising a single loop, the strands of said loop being intimately coated with glass, electrical terminals for said resistance element projecting from and sealed in the same end of said envelope and supporting one end of said resistance element therefrom, a filamentary glass spring for tensioning said resistance element, and a lead-in wire coated with glass, secured to said spring, and sealed in the other end of said envelope, said lead-in wire being effective to adjust the tension of said resistance element before being sealed in.

8. In a thermal conductivity cell provided with an elongated envelope having an inlet and an outlet for the fluid under test, an electrical resistance unit securing high thermal conductivity with the fluid being tested and minimizing the mass of the resistance element and its time of response comprising a single loop of resistance wire, the strands of said loop being intimately coated with a vitreous material rigidly to retain the respective sides of said loop closely in fixed relationship one to the other, the largest cross sectional dimension of said unit being less than one millimeter to stabilize the fluid film surrounding said unit, electrical terminals for the free ends of said loop projecting from and sealed in said one end of said envelope and resilient means formed of vitreous material connected at one end to said unit and at the opposite end to said other end of said envelope for applying a tensional force to said unit.

9. A thermal conductivity cell comprising an elongated envelope formed of glass and including an inlet and an outlet for fluid under test, one end of said envelope being provided with a reentrant portion, a bifilar electrical resistance element consisting of a single loop of resistance wire, the strands of said loop being coated with glass rigidly to fix the relationship of said strands one to the other and to form electrical insulation therefor, said glass coating being united with said reentrant portion to support said element, electrical terminals for said resistance wire projecting through and sealed within said reentrant portion, and a filamentary glass spring interconnecting the other end of said element and envelope.

GEORGE E. FREDERICKS.